(12) United States Patent
Watanabe

(10) Patent No.: US 7,970,372 B2
(45) Date of Patent: Jun. 28, 2011

(54) FREQUENCY CONVERTER CIRCUIT AND SATELLITE POSITION SIGNAL RECEIVING DEVICE

(75) Inventor: Yuusuke Watanabe, Anjo (JP)

(73) Assignee: Denso Corporation, Kariya (JP)

( * ) Notice: Subject to any disclaimer, the term of this patent is extended or adjusted under 35 U.S.C. 154(b) by 915 days.

(21) Appl. No.: 11/976,501

(22) Filed: Oct. 25, 2007

(65) Prior Publication Data

US 2008/0119157 A1 May 22, 2008

(30) Foreign Application Priority Data

Nov. 20, 2006 (JP) ................................. 2006-313376

(51) Int. Cl.
*H04B 15/00* (2006.01)
*H04B 1/26* (2006.01)

(52) U.S. Cl. ..... 455/314; 455/323; 455/132; 455/553.1; 455/76; 342/386

(58) Field of Classification Search .................. 455/132, 455/76, 552.1, 553.1, 314, 315, 323
See application file for complete search history.

(56) References Cited

U.S. PATENT DOCUMENTS

| | | | | |
|---|---|---|---|---|
| 5,040,240 A | * | 8/1991 | Keegan | 455/260 |
| 6,038,248 A | * | 3/2000 | Rabaeijs et al. | |
| 6,088,348 A | * | 7/2000 | Bell et al. | 370/343 |
| 6,356,602 B1 | * | 3/2002 | Rodal et al. | 375/344 |
| 6,675,003 B1 | * | 1/2004 | Dubash et al. | |
| 6,694,276 B2 | * | 2/2004 | Farine et al. | |
| 7,248,212 B2 | * | 7/2007 | Kato | 342/357.62 |
| 7,386,278 B2 | * | 6/2008 | Sato | 455/73 |
| 7,551,127 B2 | * | 6/2009 | Dubash et al. | 342/357.64 |

(Continued)

FOREIGN PATENT DOCUMENTS

| EP | 1 783 512 A1 | | 5/2007 |
|---|---|---|---|
| JP | A-7-128423 | * | 5/1995 |
| JP | A-10-54871 | * | 2/1998 |

OTHER PUBLICATIONS

Search Report dated Mar. 13, 2008 in corresponding Great Britain Patent Application No. GB 0722573.3.

(Continued)

*Primary Examiner* — Duc M Nguyen
(74) *Attorney, Agent, or Firm* — Posz Law Group, PLC

(57) ABSTRACT

A mixer mixes respective signals of L1, L2C, and L5-E5a with a local oscillation signal where the frequency of the L1 signal has an image relationship with the frequencies of the L2C and L5-E5a signals to conduct frequency conversion. An image removal mixer mixes the respective position signals of 1stIF with a local oscillation signal where the frequency of the L1 signal of the 1stIF has an image relationship with the frequencies of the L2C signal and the L5-E5a signal of 1stIF to conduct frequency conversion. The image removal mixer then outputs the L1 signal of 2ndIF and the L2C and L5-E5a signals of 2ndIF, independently. A branching filter separates the L2C and L5-E5a signals of 2ndIF from each other, and outputs the separated signals.

4 Claims, 3 Drawing Sheets

U.S. PATENT DOCUMENTS

| | | | |
|---|---|---|---|
| 2004/0259518 A1* | 12/2004 | Aktas et al. | 455/323 |
| 2005/0080564 A1* | 4/2005 | Tso et al. | 701/214 |
| 2005/0101248 A1* | 5/2005 | Vollath | |

OTHER PUBLICATIONS

Examination Report dated on Mar. 31, 2010 issued from the British Patent Office in the corresponding British (GB) patent application No. GB0722573.3.

Hein, et al., "Status of Galileo Frequency and Signal Design" by members of the Galileo Signal Task Force of the European Commission, Brussels, Sep. 25, 2002.*

Office Action dated on Sep. 1, 2010 issued from the Chinese Patent Office in corresponding Chinese (CN) patent application No. 200710192775.3 (English translation enclosed).

* cited by examiner

FREQUENCY CONVERTER CIRCUIT AND SATELLITE POSITION SIGNAL RECEIVING DEVICE

CROSS REFERENCE TO RELATED APPLICATION

This application is based on and incorporates herein by reference Japanese Patent Application No. 2006-313376 filed on Nov. 20, 2006.

FIELD OF THE INVENTION

The present invention relates to a frequency converter circuit and a receiving device for receiving a position signal from a positioning satellite used in a satellite positioning system.

BACKGROUND OF THE INVENTION

As a positioning system that determines the present position or the velocity of a mobile body, up to now, a global positioning system (GPS) has been used. The GSP has been widely used in not only air or vessel navigation but also a car navigation system. Also, apart from the GPS, there have been known a positioning system such as a global orbiting navigation satellite system (GLONASS), which has been developed and put into practice in Russia, and a Galileo that has been developed and put in practice by International Cooperation centered on European Union. For example, the setting of an artificial noise (PN code) or a carrier frequency used in the spread spectrum modulation of a position signal, which is broadcasted from the positioning satellite, is different between the GPS and the Galileo. However, the general positioning principle and the positioning calculating manner are similar to each other. Accordingly, a receiving device that is capable of sharing those plural positioning systems has been actively developed.

As the receiving device that is capable of sharing the plural positioning system, as disclosed in JP 7-128423A, there has been proposed a GPS/GLONASS sharing receiving device that is capable of receiving the position signals of two frequencies made up of a position signal from a positioning satellite (GPS satellite) that constructs the GPS and a position signal from a positioning satellite (GLONASS satellite) that constructs the GLONASS. The receiving device frequency-converts the respective position signal of two frequencies which have been received from the GPS satellite and the GLONASS satellite from RF (higher harmonic wave) signals to IF (intermediate frequency) signals by means of an initial-stage image removal mixer, and separates the respective position signals from each other to suppress an interference of the respective position signals, thus realizing the sharing of the GPS and the GLONASS.

In the GPS, with "GPS modernization project", the GPS satellites of the formats called "block IIR-M" and "block IIF" have been launched in recent years, and a signal of L2C (after Block IIR-M) and a signal of L5 (after block IIF) start to be broadcasted as new consumer signals in addition to L1 that has been broadcasted for consumer use by a GPS satellite of the formats of from the beginning to Block IIR. As a result, in the GPS, the position signals of three frequencies made up of L1, L2C, and L5 are available as the consumer signals.

Also, in the Galileo, the position signals of plural frequency bands such as E2-L1-E1 (L1), E5a, E5b, and E6 are scheduled to be available as the consumer signals from the beginning. When those plural position signals can be used, it is possible to realize the performance (expansion of a received area, an improvement in the positioning precision) higher than the conventional performance.

However, the receiving device disclosed in JP 7-128423A accepts the reception of only two frequencies made up of the GPS and the GLONASS, and cannot receive the position signals of three frequencies such as L1, L2C, and L5 of the GPS. Also, for example, when an ionospheric delay error which causes the deterioration of the positioning precision is corrected by the aid of the position signals of the plural frequencies to realize the positioning with high precision, there is the possibility that the position signals cannot be received in the reception of two frequencies at the same time depending on the operational status or the arrangement status of the satellite. As a result, because a time zone during which the high-precision positioning can be realized by correction is restricted, the positioning is insufficient.

On the contrary, when the position signals of three frequencies are allowed to be received, it is possible to surely conduct higher-precision positioning than the two-frequency reception. Also, when the carrier wave positioning that can obtain the high-precision positioning result is conducted by receiving the position signals of the three frequencies, it is advantageous in that integer ambiguity can be readily determined according to an extra wide lane (EWL) method.

However, in order to accept the reception of the position signals of three frequencies, a processing system that accepts the new frequency and bandwidth is required. More specifically, for example, there are required the same number of signal processing systems as the number of received position signals. Each of the signal processing systems includes a mixer portion that converts a position signal in frequency, a local oscillator used for frequency conversion, a reference oscillator, or an amplifier portion that amplifies an intermediate wave. The above processing system suffers from such a problem that the scale of the receiving device is increased. Also, when the receiving device is increased in the scale, there occurs a problem such as an increase in power consumption or an increase in the manufacture costs.

Also, for example, because two position signals are separated by the initial-stage image removal mixer, two processing systems are required in stages downstream of the initial stage. When this structure is applied to three-frequency wave reception, the receiving device is not sufficiently downsized.

SUMMARY OF THE INVENTION

It is therefore an object of the present invention to provide a frequency converter and a receiving device, which is capable of using position signals of three frequencies with simplified configuration, reduced power and reduced cost.

In order to achieve the above object, according to one aspect, a frequency converter circuit is provide to frequency-convert a first position signal, a second position signal and a third position signal, which are different from each other in the carrier frequency that has been received from an artificial satellite that is used in a satellite positioning system. The frequency converter circuit includes an oscillation signal generating section, a first mixing section, a frequency dividing section, a second mixing section and a separating section.

The oscillation signal generating section generates a first local oscillation signal of a frequency that is set so that the frequency of the first position signal has an image relationship with the frequencies of the second position signal and the third position signal, and so as not to be overlapped with the frequency bands of the respective position signals by frequency conversion due to the first mixing section. The first mixing section mixes the first local oscillation signal that is generated by the oscillation signal generating section with the first, second and third position signals to frequency-convert the respective position signals into a first intermediate frequency (1stIF). In this situation, the frequency of the first local oscillation signal is set as described above, thereby making it possible to remove image disturbance of the respective position signals in the initial-stage frequency conversion.

The frequency dividing section divides the first local oscillation signal that is generated by the oscillation signal generating section into 1/m (m is an integer of 2 or larger), to generate a second local oscillation signal of a frequency that is set so that the frequency of the first position signal of 1stIF has an image relationship with the frequencies of the second position signal of 1stIF and the third position signal of 1stIF. The second mixing section mixes the second local oscillation signal that is generated by the frequency dividing section with the first, second and third position signals of 1stIF to frequency-convert the respective position signals into a second intermediate frequency (2ndIF). The second mixing section then separates the first position signal, the second position signal, and the third position signal from each other while removing the interference of the first position signal of 2ndIF with the second position signal of 2ndIF and the third position signal of 2ndIF, that is, removing the image. The second mixing section then outputs the first position signal, the second position signal, and the third position signal from each other, independently. The separating section separates the second position signal of 2ndIF and the third position signal of 2ndIF which are mixed and output by the second mixing section from each other, and outputs the second position signal of 2ndIF and the third position signal of 2ndIF, independently.

The frequency converter circuit is capable of frequency-converting the harmonic waves (RF) of three frequencies into a position signal of the intermediate frequency (IF) without suffering from the image disturbance. Also, when the frequency conversion at a second stage is conducted in two-stage frequency conversions by the first and second mixing section, the first position signal is separated from the second position signal and the third position signal. In a subsequent separation stage, the second position signal and the third position signal are separated from each other, thereby making it possible to shorten the signal processing systems related to the respective separated position signals as compared with a case in which the respective signals are separated from each other at the time of conducting the initial-stage frequency conversion. As a result, the size reduction and the cost reduction of the frequency converter circuit are realized. Also, with the simple circuit configuration, the power consumption is reduced, and the power is saved.

In addition, the second local oscillation signal used in the frequency conversion by the aid of the second mixing section is produced by frequency-dividing the first local oscillation signal that is oscillated by the oscillation signal generating section. As a result, the frequency conversions at the respective stages can be conducted by one local oscillator without using plural local oscillator such as voltage controlled oscillators (VCO). As a result, the size reduction, the cost reduction, and the power saving of the frequency converter circuit are realized.

Also, the frequency converter circuit turns off the supply of electric power to the signal processing system related to the position signal, which is not selected as a signal to be received among the first, the second, and the third position signals. With this operation, the power consumption that is caused by the signal processing system, which is not used in the position calculation, is reduced, and the power saving is realized. More specifically, for example, a configuration can be made so as to select the enable/disable of the reception of the respective position signals according to the user's operation of an operating portion, or a configuration can be made so as to automatically select the enable/disable of the reception of the respective position signals on the basis of the quality of the reception state.

Here, when the position signals of the three frequencies are received, it is assumed that plural position signals, which are broadcasted by the same satellite positioning system such as L1, L2C, or L5 of the GPS are received, or that the position signals that are broadcasted by the plural satellite positioning systems such as the GPS or the Galileo are received. Then, the position calculation is conducted while the positioning satellites of the respective satellite positioning systems are used together as the occasion demands, thereby making it possible to excellently maintain the positioning precision.

In this situation, when the position signals are identical even in the different satellite positioning system such as the signals of GPS-L1 and Galileo-L1 (both of those signals are 1575.42 MHz in the carrier frequency), or the signals of GPS-L5 and Galileo-E5a (both of those signals are 1176.45 MHz in the carrier frequency), it is possible to receive the position signals at the same time by one receiving system.

According to a second aspect, a satellite position signal receiving device includes a receiving section for receiving the position signal that is transmitted in a radio electric wave form from an artificial satellite that is used in the satellite positioning system, the above frequency converter circuit, demodulating section for demodulating the first, second and third position signals that have been subjected to frequency conversion by the frequency converter circuit, respectively, and a control section.

Among those sections, the demodulating section includes the respective first, second and third demodulating systems. Then, at least one of the first, second and third demodulating systems includes diverse demodulator circuits in each of the plural satellite positioning systems and demodulator circuits that can be shared by the plural satellite positioning systems by the number that can ensure the number of circuits that satisfy the largest number of satellites which are used in the position calculation related to the respective satellite positioning systems. With the above configuration, the position signal of the same carrier frequency related to the plural satellite positioning systems can be demodulated.

The control section selects the positioning satellite used in the position calculation according to the reception state of the position signal when demodulating the position signal by the aid of the demodulating section, allocates any demodulator circuit to the selected positioning satellite, and conducts the position calculation on the basis of the position signal that has been demodulated by the allocated demodulator circuit.

When the above configuration is applied to the GPS and the Galileo, there is proposed, for example, a configuration that receives the GPS-L1 and the Galileo-L1 as a first position signal at the same time, receives the GPS-L2 as a second position signal, and receives the GPS-L5 and the Galileo-E5a as a third position signal at the same time, at the frequency converter circuit side.

The above configuration of the frequency converter circuit includes diverse demodulator circuits of the respective GPS-L1 and Galileo-L1 in the first demodulation system, and a demodulator circuit shared by the GPS-L1 and the Galileo-L1. Those circuits are appropriately distributed to the GPS and the Galileo according to the reception state, thereby enabling the hybrid positioning that receives the position signals of the GPS and the Galileo in one receiving system at the same time. Also, when the GSP-L2 can be demodulated in the second demodulation system, and the GPS-L5 and the Galileo-E5a can be demodulated in the third demodulation system, respectively, the results of the position calculation which is conducted by the respective position signals of the GPS-1 or the Galileo-L2 can be corrected by the respective position signals from the second modulation system or the third modulation system, respectively.

Also, the positioning satellite suitable to the position calculation is selected from the positioning satellites related to the GPS and the Galileo according to the reception state of the position signal. Then, the demodulator circuit is allocated to the selected positioning satellite, thereby making it possible to receive the position signal in combination with the positioning satellites which enhance the positioning precision to conduct the position calculation. As a result, the excellent positioning precision can be held.

The demodulator circuit that can be shared by the plural satellite positioning systems is employed as in the demodulator circuits that can be shared by the GPS-L1 and the Galileo-L1 described in the above example. As a result, the largest number of demodulator circuits used in the position calculation due to the respective satellite positioning systems can be satisfied by the smaller number of demodulator circuits as compared with a case in which the largest number of diverse demodulator circuits for the respective satellite positioning systems which are used in the position calculation due to the respective satellite positioning systems is made up. As a result, the satellite position signal receiving device can be reduced in size and in const.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
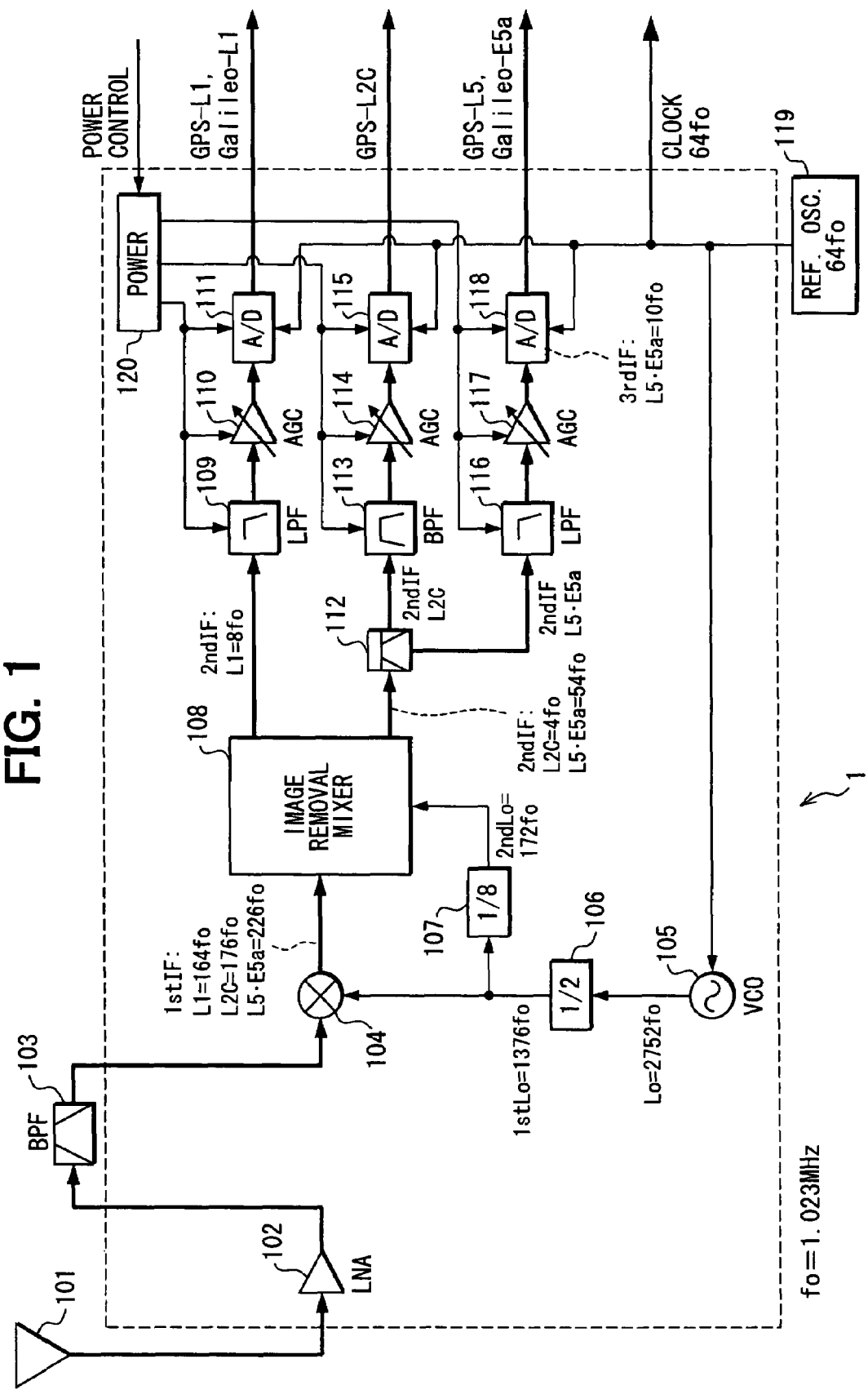
FIG. 1 is a block diagram showing an RF front end section that is a part of a satellite position signal receiving device according to an embodiment of the present invention.

Referring to FIG. 1, a satellite position signal receiving device includes an antenna 101 that receives a position signal from a positioning satellite, an RF front end section 1 that frequency-converts a position signal that has been received from the positioning satellite and outputs the converted position signal as a digital signal. The RF front end section 1 is connected to a signal processing section 2 shown in FIG. 2 that acquires and follows a carrier wave and a PN code from the positioning satellite, and demodulates the position signal that has been supplied from the RF front end section 1 to conduct the position calculation.

In this embodiment, the following five kinds of position signals having three frequencies used in the respective satellite positioning systems of the GPS and the Galileo are applied as the receivable position signals.

(1) GPS-L1 and Galileo-L1 (both of those signals are 1575.42 MHz)
(2) GPS-L2C (1227.6 MHz)
(3) GPS-L5 and Galileo-E5a (both of those signals are 1176.45 MHz)

All of the carrier frequencies of the position signals of the respective frequencies in the above items (1) to (3) are produced by the multiplication of fo=1.023 MHz (fo is 1/10 of 10.023 MHz which is a fundamental frequency of the GPS). That is, the carrier frequencies of the position signals (collectively represented simply by "L1") of the GPS-L1 and the Galileo-L1 in the above item (1) is expressed by 1540fo, the carrier frequency of the position signal of the GPS-L2C (represented simply "L2C") in the above item (2) is expressed by 1200fo, and the carrier frequencies of the position signals of the GPS-L5 and the Galileo-E5a (collectively represented simply by "L5-E5a") in the above item (3) are expressed by 1150fo.

In the GPS and the Galileo, when the position signal is transmitted from the positioning satellite, the position signal is subjected to a spread spectrum modulation by the aid of a given PN code. The satellite position signal receiving device that has received the position signal from the positioning satellite frequency-converts the received position signal from the higher harmonic wave (RF) into an intermediate frequency (IF), and then into a base band. Then, the satellite position signal receiving device acquires the carrier wave from the positioning satellite that transmits the position signal as well as the PN code that is used in the spread spectrum modulation by the positioning-satellite, and demodulates the received position signal. The satellite position signal receiving device calculates an artificial distance (pseudo distance) to the positioning satellite or the positions of the respective positioning satellites by the aid of the demodulated position signals, or corrects the diverse errors such as an ionospheric delay to calculate the present position, the velocity, or the orientation according to the calculated diverse data.

The RF front end section 1 (FIG. 1) is a frequency converter circuit. The RF front end section 1 includes a low noise amplifier (LNA) 102, a band pass filter (BPF) 102, a mixer 104, a voltage controlled oscillator (VCO) 105, frequency dividers 106, 107, and an image removal mixer 108. The RF front end section 1 also includes low pass filters (LPF) 109, 116, a branching filter 112, a band pass filter (BPF) 113, AGC (automatic gain control) amplifiers 110, 114, 117, A/D converters 111, 115, 118, a reference oscillator 119, and a power supply controller 120.

The antenna 101 is constructed by a triple band antenna that receives the respective position signals of L1, L2C and L5-E5a, or a dual band antenna that has the frequency band of L1 as one pole and has another pole in an intermediate frequency band between both of the frequency bands L2C and L5-E5a to provide a broad characteristic. The antenna 101 receives the position signals from the GPS satellite and the Galileo satellite.

The RF signals of the respective position signals that have been received by the antenna 101 are amplified by the LNA 102 with low noises. The RF signals of the respective position signals that have been amplified by the LNA 102 are limited in the frequency band by the BPF 103. The BPF 103 is constructed by, for example, an SAW filter, and the pass band is constructed by a triple band that allows the respective frequency bands of the L1, L2C and L5-E5a to pass through the BPF 103, or a dual band including a band that allows the frequency band of L1 to pass through the BPF 103, and a band that allows both of the frequency bands L2C and L5-E5a to pass through the BPF 103.

The RF signals of the respective position signals that are limited in the band by the BPF 103 are mixed with a first local oscillation signal (1stLo) that is obtained by dividing an oscillation signal (Lo) from the VCO 105 by the frequency divider 106 in the mixer 104, thereby being converted into a first intermediate frequency (1stIF). In this example, the frequency of 1stLo is set so that the carrier frequency of L1 has an image relationship with the carrier frequencies of L2C and L5-E5a viewed from the 1stLo side, and set to a frequency that is not overlapped with the frequency bands of the respective position signals by conducting the frequency conversion. That is, the frequency of 1stLo is set to a substantially intermediate frequency between the carrier frequency of L1 and the frequency band of L2C to L5-E5a (more specifically, 1376fo that is the multiplication of fo). The 1stLo is produced by dividing the Lo (frequency: 2752fo) which is generated from the VCO 105 at a frequency by which a comparison frequency with a reference clock (frequency: 64fo) which is generated by the reference oscillator 119 becomes sufficiently high into ½ frequency by the frequency divider 106.

The L1 of the RF is mixed with the 1stLo in the mixer 104, and is converted into 1stIF (L1) of the frequency 164fo. Likewise, the L2C of the RF is converted into the 1stIF (L2C) of the frequency 176fo. Also, the L5-E5a of the RF is converted into the 1stIF (L5-E5a) of the frequency 226fo.

The respective position signals of the 1stIF which have been subjected to frequency conversion by the mixer 104 is mixed with a second local oscillation signal (2ndLo) that is obtained by dividing the 1stLo by the frequency divider 107, and converted into a second intermediate frequency (2ndIF). In this example, the frequency of 2ndLo is set to a frequency (more specifically, 172fo that is the multiplication of fo) such that the frequency of the L1 of 1stIF has an image relationship with the frequencies of the L2C and L5-Ea of the 1stIF viewed from the 2ndLo side. That is, the frequency of 2ndLo is set to a substantially intermediate frequency between the carrier frequency of L1 of the 1stIF and the frequency band of L5-E5a of L2C to 1stIF of the 1stIF. The 2ndLo is produced by dividing the 1st Lo (frequency: 1376 fo) into ⅛ frequency by the frequency divider 107.

The L1 of the 1stRF is mixed with the 2ndLo in the image removal mixer 108, and is converted into 2ndIF (L1) of the frequency 8fo. Likewise, the L2C of the 1stIF is converted into the 2ndIF of the frequency 4fo. Also, the L5-E5a of the 1stIF is converted into the 2ndIF of the frequency 54fo.

The image removal mixer 108 separates the respective signals from each other while removing the interference of the L1 of the 2ndIF that has been subjected to the frequency conversion IF with L2C and L5-E5a of 2ndIF, that is, removing the image. The image removal mixer 108 then outputs those signals, independently. That is, the L1 of the 2ndIF and the L2C and L5-E5a of the 2ndIF are separated from each other at this stage.

The L1 of the 2ndIF that has been output from the image removal mixer 108, independently, is band-limited in the pass band of the center frequency 8fo by the LPF 109, and thereafter amplified by the AGC amplifier 110 up to a level that satisfies an input level necessary for the subsequent analog/digital conversion. The L1 of the 2ndIF which has been amplified by the AGC amplifier 110 is converted into a digital signal by means of the A/D converter 111, and then supplied to the signal processing section 2.

The LPF 109, the AGC amplifier 110, and the A/D converter 111, which construct the signal processing system related to the L1 of the 2ndIF that has been output from the image removal mixer 108 are so configured as to collectively change over the on/off state of a power supply in each of the systems under the control from the power supply controller 120. As a result, when the signal of L1 is not received from the positioning satellite, the power supply of the system is cut off to reduce the electric power consumption in the RF front end section 1.

On the other hand, the L2C and the L5-E5a of the 2ndIF are mixed together and output from the image removal mixer 108. The L2C and the L5-E5a of the 2ndIF which have been output from the image removal mixer 108 are separated from each other by the branching filter 112, respectively. The L2C of the separated 2ndIF is band-limited in the pass band of the center frequency 4fo by the BPF 113, and thereafter amplified by the AGC amplifier 114 up to a level that satisfies an input level necessary for the subsequent analog/digital conversion. The L2C of the 2ndIF which has been amplified by the AGC amplifier 110 is converted into a digital signal by means of the A/D converter 115, and then supplied to the signal processing section 2.

The BPF 113, the AGC amplifier 114 and the A/D converter 115, which construct the signal processing system related to the L2C of the 2ndIF that has been output from the branching filter 112, are so configured as to collectively change over the on/off state of a power supply in each of the systems under the control from the power supply controller 120. As a result, when the signal of L2C is not received from the positioning satellite, the power supply of the system is cut off to reduce the electric power consumption in the RF front end section 1.

On the other hand, the L5-E5a of the 2ndIF which has been separated by the branching filter 112 is band-limited in the pass band of the center frequency 54fo by the BPF 116, and thereafter amplified by the AGC amplifier 117 up to a level that satisfies an input level necessary for the subsequent analog/digital conversion. The L5-E5a of the 2ndIF, which has been amplified by the AGC amplifier 117, is converted down into a third intermediate frequency (3rdIF) of the frequency 10 fo with the reference clock of the frequency 64fo that is oscillated from the reference oscillator 119 as a sample frequency in the A/D converter 118. Then, the L5-E5a of the 3rdIF is converted into a digital signal, and then supplied to the signal processing section 2.

The LPF 116, the AGC amplifier 117, and the A/D converter 118 which construct the signal processing system related to the L5-E5a of the 2ndIF that has been output from the branching filter 112 are so configured as to collectively change over the on/off state of a power supply in each of the systems under the control from the power supply controller 120. As a result, when the signal of L5-E5a is not received from the positioning satellite, the power supply of the system is cut off to reduce the electric power consumption in the RF front end section 1.

The power supply controller 120 changes over the on/off state of the power supply with respect to the above respective systems on the basis of the power supply control signal from the arithmetic processing section 5 of the signal processing section 2. For example, there is proposed a configuration in which the operation of selecting any one of three-frequency reception and two-frequency reception by means of a switch (not shown), or the operation of selecting any signal to be received from the L1, L2C and L5-E5a is accepted, and the power is supplied to only the system related to the position signal that has been selected as an object to be received. Also, a configuration can be made such that the arithmetic processing section 5 selects the enable/disable of the reception of the respective position signals from the quality of the reception state of the position signal, and the power is supplied to only the system related to the position signal that has been selected as the signal to be received by the arithmetic processing section 5.

The signal processing section 2 (FIG. 2) includes a down-converter section 3, a signal processor section 4, and an arithmetic processing section 5. In the following description, for convenience of description, the system related to the signal processing for the signal of L1 is called "first system (#1)", the system related to the signal processing for the signal of L2C is called "second system (#2)", and the system related to the signal processing for the signal of L5-E5a is called "third system (#3)".

The down-converter section 3 includes mixers 31*a*, 31*b* and 31*c*, LPFs 32*a*, 32*b* and 32*c*, and frequency dividers 33*a*, 33*b* and 33*c* in the respective first, second, and third systems.

The respective position signals of L1, L2c, and L5-E5a which have been supplied from the RF front end section 1 are mixed with the oscillation signals that are generated in the respective frequency dividers 33*a*, 33*b* and 33*c* in the respective mixers 31*a*, 31*b* and 31*c*, and then converted into the base band. In this example, the respective frequency dividers 33*a*, 33*b* and 33*c* generate the oscillation signals of the same frequencies as the respective intermediate frequencies of the L1 and L2c of the 2ndIF and the L5-E5a of 3rdIF, respectively, by dividing the reference clock that is supplied from the RF front end section 1.

The respective position signals of the L1, L2c and L5-E5a which have been converted into the base band by the respective mixers 31*a*, 31*b*, and 31*c* are limited in the band by the LPFs 32*a*, 32*b* and 32*c*, respectively, and then supplied to the signal processor section 4. In the first system, because the bandwidth required for demodulation of the position signal is different between the GPS-L1 and the Galileo-L1, the LPF 32*a* changes the pass band of the signal according to a GPS/Galileo identification signal that is output from the arithmetic processing section 5.

The signal processing section 4 includes plural signal processors 40*a*, 40*b* and 40*c* corresponding to the number of channels of the positioning satellite which are used in the position calculation in the respective first, second and third systems. In the following description, when the respective signal processors 40*a*, 40*b* and 40*c* are not particularly distinguished from each other, symbols a, b and c are not added to the signal processor as "signal processor 40" The same is applied to the structures of the respective sections within the respective signal processors 40.

Each of the signal processors 40 includes mixers 41, 42, a carrier wave generator 43, and a code generator 44. The carrier wave generator 43 oscillates at a frequency that is set according to a carrier frequency setting signal (CFSS) from the arithmetic processing section 5 in synchronism with the reference clock that is supplied from the RF front end section 1. The frequency that is set by the arithmetic processing section 5 corresponds to the carrier frequency of the position signal to be processed by the respective signal processors 40. The respective position signals that are supplied from the down-converter section 3 are mixed with the output of the carrier wave generator 43 in the mixer 41. The output signal of the mixer 41 is supplied to the arithmetic processing section 5 through the mixer 42. The arithmetic processing section 5 detects the carrier frequency on the basis of the supplied signal, and outputs the carrier frequency setting signal corresponding to the detected frequency to the carrier wave generator 43. That is, the mixer 41 and the carrier wave generator 43 in the signal processor 40 construct a carrier wave following loop that acquires and follows the carrier waves of the respective position signals of the GPS or the Galileo through the arithmetic processing section 5.

The output signal of the mixer 41 is mixed with the output signal of the code generator 44 in the mixer 42 so as to be demodulated into an original signal wave. The code generator 44 generates the PN code that is set according to a code setting signal CSS from the arithmetic processing section 5 in synchronism with the reference clock that is supplied from the RF front end section 1. In the GPS and the Galileo, when the position signal is transmitted from the positioning satellite, the position signal is subjected to the spread spectrum modulation by the aid of a given PN cod. Under the circumstances, the same PN code as the PN code used in the spread modulation of the position signal is generated in the code generator 44, and the generated PN code is mixed with the position signal that has been converted into the base band in the mixer 42 to conduct the reverse spread spectrum on the position signal. The mixer 42 and the code generator 44 in the signal processor 40 constructs a delay lock loop (DLL) that conducts the operation of acquiring and following the PN codes of the respective position signals of the GPS or the Galileo through the arithmetic processing section 5. Also, the arithmetic processing section 5 is capable of calculating the artificial distance between the positioning satellite and the satellite positioning receiving device according to a time difference between the phase of the PN code that has been generated by the code generator 44 and the phase of the PN code from the positioning satellite.

In the first system, the signal processor 40*a* having the above configuration has 12 circuits (channels) in total, including four GPS-L1 dedicated circuits, four circuits that can be shared by both signals of the GPS-L1 and the Galileo-L1, and four Galileo-L1 dedicated circuits. According to the above configuration, the number of channels that acquire the respective position signals of the GSP-L1 and the Galileo-L1 can be changed between four and eight channels by appropriately changing the distribution of the GPS signal and the Galileo signal with respect to the four signal processors 40*a* that are capable of processing both signals of the GPS-L1 and the Galileo-L1. In the second system, the signal processor 40*b* has eight dedicated GPS-L2C dedicated circuits (channels), and in the third system, the signal processor 40*c* has eight circuits (channels) that can be shared by both signals of the GPS-L5 and the Galileo-E5a.

The arithmetic processing section 5 includes a CPU, and executes various processing such as the determination of the positioning satellite used in the position calculation, the setting of the carrier frequency and the setting of the PN code with respect to the signal processor 40 related to a process of receiving the position signal from the determined positioning satellite, the calculation of the artificial distance or the positions of the respective positioning satellites due to the analysis of the decoding signals that are outputs from the respective signal processors 40, the correction of the diverse errors such as an ionospheric delay, the calculation of the present position, the velocity, and the orientation due to the calculated diverse data, or the diverse processing such as the power supply control of the RF front end section 1.

In the satellite position signal receiving device according to this embodiment, the L2C and the L5-E5a among the positioning singles of three frequencies of L1, L2C, and L5-E5a are used for the purpose of correcting the ionospheric delay error. For that reason, the arithmetic processing section 5 conducts a process of retrieving the combination of the channels optimum to the position calculation by sequentially changing over the distribution of the channels of the GPS and the Galileo with respect to the signal processor 40*a* (four circuits) which can be shared by both signals of the GPS-L1 and the Galileo-L1 in the system (that is, the first system) related to the signal processing of L1 in the signal processor section 4. Hereinafter, the details of the "channel selecting process" will be described below.

The RF front end section 1 in the satellite position signal receiving device according to this embodiment forms the frequency converter circuit. In the RF front end section 1, the voltage controlled oscillator (VCO) 105 and the frequency divider 106 form an oscillation signal generating section, and the mixer 104 forms a first mixing section. Also, the frequency divider 107 corresponds to a frequency dividing section, the image removal mixer 108 forms a second mixing section, and the branching filter 112 forms a separating section. Also, the antenna 101 forms a to receiving section, the signal processor section 4 in the signal processing section 2 forms a demodulating section, and the arithmetic processing section 5 forms a control section.

Figure 3:
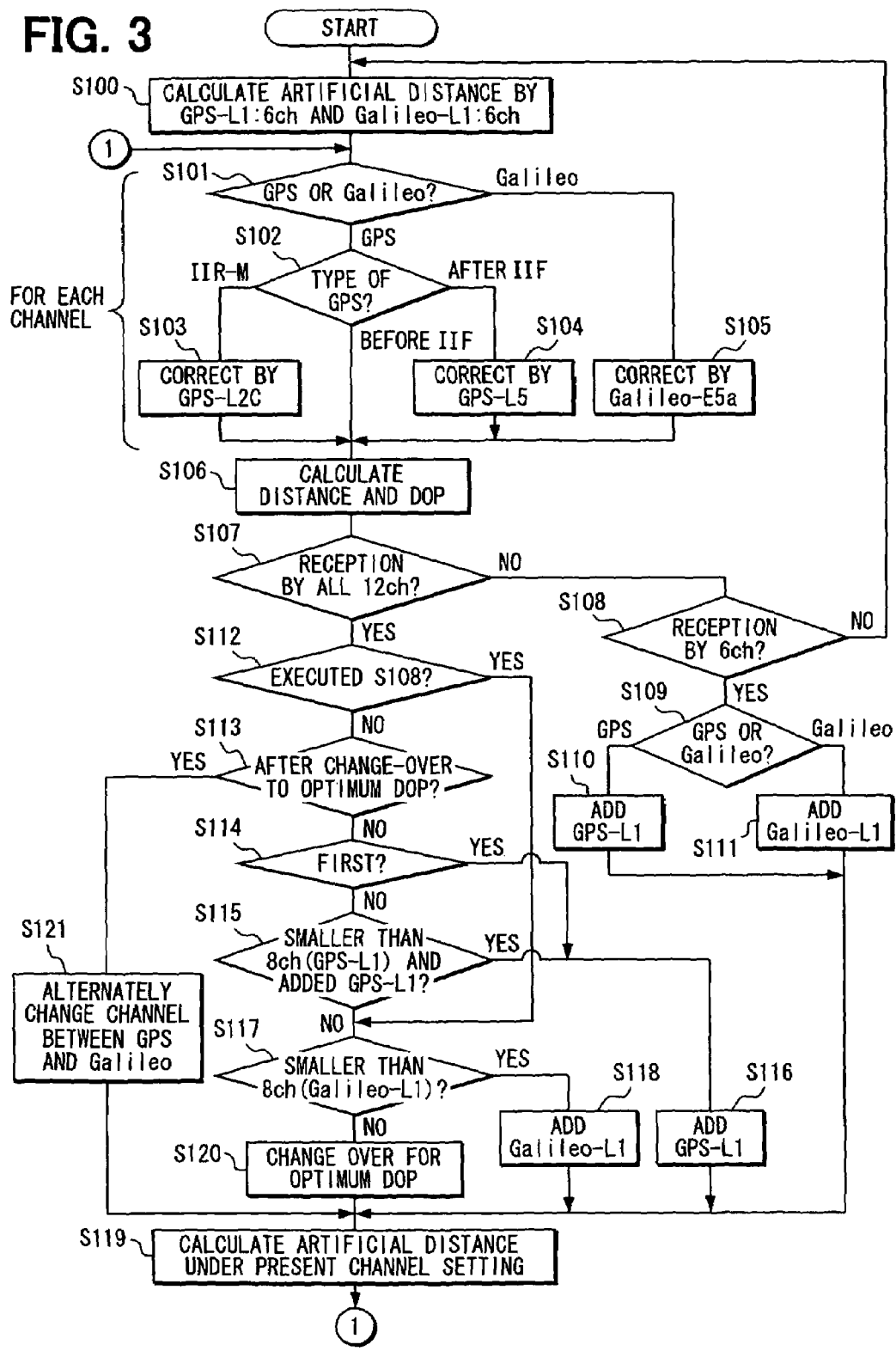
FIG. 3 is a flowchart showing a procedure of channel selecting process that is executed by an arithmetic processing section of the signal processing section shown in FIG. 2.

The arithmetic processing section 5 is programmed to execute a channel selecting process shown in FIG. 3.

Upon starting the channel selecting process, the arithmetic processing section 5 allocates the GSP-L1 and the Galileo-L1 to the respective signal processors 40*a* six channels by six channels, respectively, and calculates the artificial distance to the positioning satellite corresponding to the respective channels on the basis of the position signals that have been received by the respective channels at step 100 (S100).

In this example, it is assumed that the processing of the following S101 to S105 is executed in each of the channels that receive the position signals in the first system. First, it is checked whether the signal that is acquired by the subject channel is the GPS-L1 signal or the Galilee-L1 signal (S101). In this example, when the signal that is acquired by the subject channel is the GPS-L1 signal (GPS in S101), the type of the GSP satellite related to the subject channel is confirmed (S102). When it is determined that the type of the GPS satellite is "Block IIR-M" (IIR-M in S102), the GPS satellite of this type broadcasts the signal of L2C together with the signal of L1. Therefore, the arithmetic processing section 5 corrects the ionospheric delay of the position signal by the aid of the signal of L2C from the same GPS satellite which is input through the second system related to the signal processing of L2C (S103). On the other hand, when it is determined that the type of the GPS satellite is a type after "Block IIR-F" (after IIF in S102), the GPS satellite of this type broadcasts the signal of L5 together with the signal of L1. Therefore, the arithmetic processing section 5 corrects the ionospheric delay of the position signal by the aid of the signal of L5 from the same GPS satellite which is input through the third system related to the signal processing of L5 (S104). On the other hand, when it is determined that the type of the GPS satellite is a type before "Block IIR" (before IIR in S102), the GPS satellite of this type broadcasts only the signal of L1 as a customer use. Therefore, the processing is shifted to a subsequent step without correcting the ionospheric delay.

On the other hand, when it is determined that the signal that is received by the subject channel is the Galileo-L1 signal in S101 (Galileo in S101), the arithmetic processing section 5 corrects the ionospheric delay of the position signal by the aid of the signal of E5a from the same Galileo satellite which is input through the third system related to the signal processing of E5a (S105).

Subsequently, the arithmetic processing section 5 again calculates the artificial distances to the respective positioning satellites on the basis of the results of correcting the ionospheric delay in each of the channels in S103, S104 and S105, and calculates the precision deterioration index DOP (dilution of precision) in the present channel setting (S106). The DOP is an index indicative of the degree of deterioration of the positioning precision due to the arrangement status of the positioning satellites (the positioning precision is better as a numeric value is smaller). The quality of the reception status of the position signal can be determined according to the index.

After the artificial distance and the DOP have been calculated in S106, it is checked whether or not the position signals can be acquired or received by all of 12 channels (S107). In this situation, when there is a channel that cannot be acquired (NO in S107), it is checked whether or not six or more channels can be acquired in any one of the GPS-L1 and the Galileo-L1 (S108). When six or more channels cannot be acquired in all of the GPS-L1 and the Galileo-1 (NO in S108), the processing returns to the processing in S100 while continuing to acquire the position signal in an unused channel.

On the other hand, when it is determined that six or more channels can be acquired in any one of the GPS-L1 and the Galileo-L1 (YES in S108), in the case of the GPS-L1 (GPS in S109), one channel of the GPS-L1 is added to the unused channel (S110). On the other hand, when six or more channels can be acquired in the Galileo-L1 (Galileo in S109), one channel of the Galileo-L1 is added to the unused channel (S111). After the acquired channels are added in S110 or S111, respectively, the artificial distances to the positioning satellite corresponding to the respective channels are calculated on the basis of the position signals that have been received in the channel setting (S119), and the processing returns to the processing of S101.

On the other hand, when it is determined that the position signals can be acquired in all of the 12 channels in S107, the processing is shifted to S117 in the case where the previous routine loop is routed through S108 (YES in S112), and the processing is shifted to S113 in the case where the previous routine loop is not routed through S108 (NO in S112), that is, S108 has not been executed. In S113, it is checked whether or not the combination of the channels acquired in S120 which will be described later changes over to setting where DOP becomes optimum. When it is determined that the combination of the channels has not yet changed over to setting where DOP becomes optimum (NO in S113), the processing is shifted to S114. In S114, when the routine loop is first routed through this step (YES in S114), the processing is shifted to S116.

In S116, the channel of GPS-L1 is newly allocated to one of the circuits to which the channel of the Galileo-L1 is allocated among the signal processors 40*a* that can be shared by both signals of the GPS-L1 and the Galileo-L1, and one channel of GPS-L1 is added as the acquired channel. That is, in this example, one channel of the GPS-L1 is increased among 12 acquired channels, and one channel of the Galileo-L1 is decreased. After one channel of the GPS-L1 has been added in S116, the artificial distances to the positioning satellite corresponding to the respective channels are calculated on the basis of the position signal that has been received in the present channel setting (S119), and the processing is returned to the processing of S101.

On the other hand, when the second or later routine loop is routed through this step (NO in S114), the processing is shifted to S115. In S115, it is checked whether the number of channels of the GPS-L1 is smaller than eight in the present channel setting, and one channel of the GPS-L1 is added when the previous channel setting is changed. In this example, in the case of affirmative determination (YES in S115), one channel of the GPS-L1 is again added as the acquired channel (S116). In the case of the negative determination (NO in S115), that is, in any case where eight channels of the GPS-L1 are currently acquired (the largest number of acquirable channels), or where one channel of the Galileo-L1 is added when the channel setting is previously changed, it is checked whether or not the number of channels of the Galileo-L1 is smaller than eight in the present channel setting (S117).

In this example, when it is determined that the number of channels of the Galileo-L1 is smaller than eight (YES in S117), the channel of the Galileo-L1 is newly allocated to one of the circuits to which the channel of the GPS-L1 is allocated among the signal processors 40a that can be shared by both signals of the GPS-L1 and the Galileo-L1, and one channel of the Galileo-L1 is added as the acquired channel (S118). That is, one channel of the GPS-L1 is decreased, and one channel of the Galileo-L1 is increased in the acquired 12 channels. After one channel of the Galileo-L1 is added in S118, the artificial distances to the positioning satellite corresponding to the respective channels are calculated on the basis of the position signal that has been received in the present channel setting (S119), and the processing is returned to the processing of S101.

The processing of S101 to S119 is sequentially repeated in the above procedure, thereby calculating the artificial distance with respect to all of the combinations (S100 and S119) and the DOP (S106) in the distribution of the channels of the GPS-L1 and the Galileo-L1 to the 12 signal processors 40a. Then, when it is determined that the number of channels of the Galileo-L1 is eight in the present channel setting in S117 (NO in S117), the setting changes over to setting where the DOP is smallest (that is, the reception state is excellent) among the combination of the channels which have been attempted up to here from the present channel combination (S120). Then, the artificial distance is calculated in the channel setting (S119), and the processing is returned to the processing of S101. In the subsequent routine loop, the affirmative determination (YES in S113) is conducted in S113, the channel is alternately changed over between the GPS-L1 and the Galileo-L1 in the channel that is lowest in the contribution to the positioning precision in the present channel setting (S121), and the above processing is repeated. The contribution to the positioning precision can be determined on the basis of the conditions that influence the positioning precision such as variations of the altitude or the position of the respective positioning satellites.

More specifically, when the channel that is lowest in the contribution to the positioning precision is the channel of the GPS satellite, the channel is changed over to the channel of the Galileo satellite. Conversely, when the channel that is lowest in the contribution to the positioning precision is the channel of the Galileo satellite, the channel is changed over to the channel of the GPS satellite. In this way, after the channels is changed over to the channel setting where the DOP becomes optimum, the above operation is repeated so as to always maintain the high positioning precision.

The satellite position signal receiving device according to the above embodiment provides the following advantages.

The RF front end section 1 of the satellite position signal receiving device (FIG. 1) is capable of conducting the frequency conversion of from the harmonic (RF) position signal of three frequencies of L1, L2C, and L5-E5a to the position signal of the intermediate frequency (IF) without suffering from the image disturbance. The signal of L1 is separated from the signals of L2C and L5-E5a in the second frequency conversion of the two-stage frequency conversions in the mixer 104 and the image removal mixer 108. Thereafter, the signal of L2C and the signal of L5-E5a are separated from each other in the branching filter 112. As a result, the signal processing system related to the respective position signals that have been separated from each other can be shortened as compared with a case where the respective signals are separated from each other at the time of the initial frequency conversion. With the above configuration, the frequency converter circuit is reduced in size, and the costs are reduced. Also, since the circuit is simple in the configuration, the power consumption is reduced, and the power is saved.

The second local oscillation signal that is mixed with the position signal in the image removal mixer 108 oscillates in the VCO 105, and the first local oscillation signal that has been divided by the frequency divider 106 is further divided and used. As a result, the frequency conversions at the respective stages can be conducted by one VCO without using the plural VCOs. With the above configuration, the RF front end section 1 is reduced in size, the costs are reduced, and the power is saved.

Also, a power is supplied to only the signal processing system related to the position signal that has been selected as the signal to be received, and the supply of the electric power to the signal processing system related to the position signal that is not selected as a signal to be received is turned off. As a result, the power consumption in the RF front end section 1 is reduced, and the power saving is realized.

Figure 2:
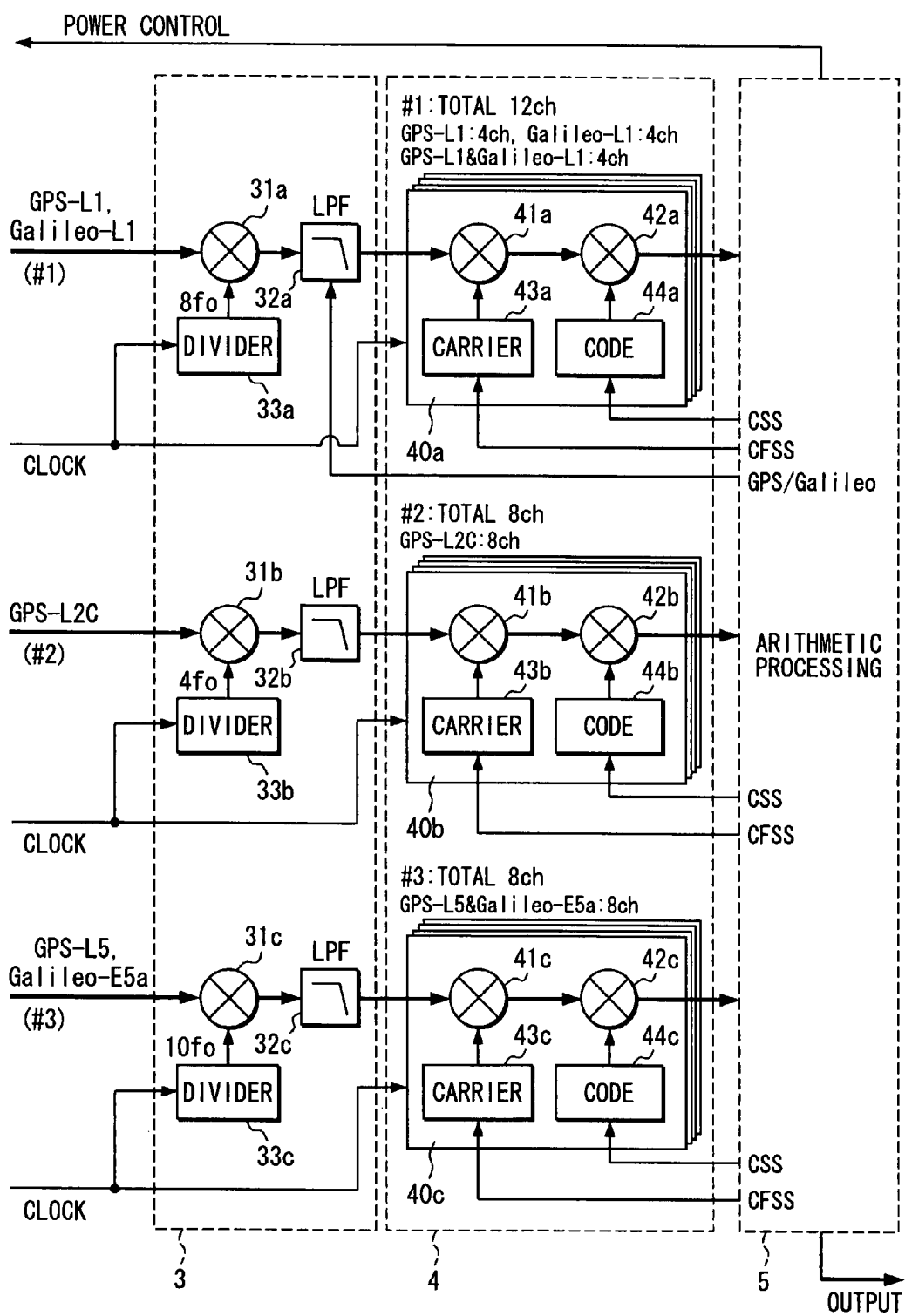
FIG. 2 is a block diagram showing a signal processing section that is a part of the satellite position signal receiving device according to the embodiment.

In the signal processing section 2 shown in FIG. 2, the signal processor 40 has 28 channels in total, including 12 channels in the first system (L1), eight channels in the second system (L2C), and eight channels in the third system (L5-E5a). The signal processor 40 is capable of acquiring the positioning satellite of the number that can obtain the sufficient positioning precision.

Among those systems, the first system includes dedicated signal processors 40a for the respective GPS-L1 and the Galileo-L1, and the signal processor 40a that can be shared by the GPS-L1 and the Galileo-L1. The distribution of the channels to the GPS-L1 and the Galileo-L1 can be appropriately changed according to the reception state of the position signal, and the position signal is received by the channel setting that enhances the positioning precision, thereby enabling the excellent positioning precision to be held.

Also, since the signal processor 40a that can be shared by the GPS-L1 and the Galileo-L1 is used, the largest number of demodulator circuits used in the position calculation due to the respective satellite positioning systems can be satisfied by the smaller number of demodulator circuits as compared with a case in which the largest number of diverse demodulator circuits for the respective satellite positioning systems, which are used in the position calculation due to the respective satellite positioning systems is made up. As a result, the satellite position signal receiving device can be downsized and reduced in the costs.

What is claimed is:

1. A frequency converter circuit that frequency-converts a first position signal, a second position signal and a third position signal, which are different from each other in carrier frequency and received from artificial satellites used in a satellite positioning system, the frequency converter circuit comprising:

an oscillation signal generating section for generating a first local oscillation signal of a frequency that is set so that a frequency of the first position signal has an image relationship with frequencies of the second position signal and the third position signal, with respect to the frequency of the first oscillation signal, and so that frequency bands of the respective position signals do not overlap after being frequency-converted;

a first mixing section for mixing the first local oscillation signal with the first, second, and third position signals to frequency-convert the respective position signals into a first intermediate frequency;

a frequency dividing section for dividing the first local oscillation signal into 1/m, in which m is an integer of 2 or larger, to generate a second local oscillation signal of a frequency that is set so that the frequency of the first position signal of the first intermediate frequency has an image relationship with the frequencies of the second position signal of the first intermediate frequency and the third position signal of the first intermediate frequency;

a second mixing section for mixing the second local oscillation signal with the first, second, and third position signals of the first intermediate frequency to frequency-convert the respective position signals into a second intermediate frequency, separating the first position signal of the second intermediate frequency from the second position signal of the second intermediate frequency and the third position signal of the second intermediate frequency, while removing the interference of the first, second, and third position signals with each other, and independently outputting the first position signal, the second position signal and the third position signal of the second intermediate frequency; and a separating section for separating the second position signal of the second intermediate frequency and the third position signal of the second intermediate frequency from each other, and independently outputting the second position signal of the second intermediate frequency and the third position signal of the second intermediate frequency.

2. The frequency converter circuit according to claim 1, further comprising:

three signal processing systems that process the first, second and third position signals of the second intermediate frequency, which are output by the second mixing section and the separating section; and a power section for turning off a supply of electric power to a signal processing system related to the position signal which is not selected as a signal to be received among the first, the second and the third position signals.

3. A satellite position signal receiving device, comprising:

a receiving section for receiving a first position signal, a second position signal and a third position signal transmitted from artificial satellites used in a satellite positioning system in the form of a radio electric wave;

a frequency converter circuit according to claim 1; and a demodulating section for demodulating the first, second and third position signals that are frequency-converted by the frequency converter circuit, respectively;

wherein the demodulating section includes:

a first demodulating system including a corresponding number of demodulating circuits that demodulate the first position signal to a number of positioning satellites used in position calculation using the first position signal;

a second demodulating system including a corresponding number of demodulating circuits that demodulate the second position signal to a number of positioning satellites used in position calculation using the second position signal;

a third demodulating system including a corresponding number of demodulating circuits that demodulate the third position signal to a number of positioning satellites used in position calculation using the third position signal; and a control section for executing position calculation, wherein at least one of the first, second and third demodulating systems includes diverse demodulator circuits for each of a plurality of satellite positioning systems and demodulator circuits that can be shared by the plurality of satellite positioning systems in a number sufficient to accommodate the largest number of satellites which are used in the position calculation related to the respective satellite positioning systems, and can demodulate the position signals of the same carrier frequency related to the plurality of satellite positioning systems, and wherein the control section selects the positioning satellite used in the position calculation according to a reception state of the position signal when the demodulating section demodulates the position signal, allocating any one of the demodulating circuits to the selected positioning satellite, and executing the position calculation based on the position signal demodulated by the allocated demodulating circuit.

4. The frequency converter circuit according to claim 1, wherein the first oscillation signal has an intermediate frequency that is between a carrier frequency of the first position signal, and a frequency band of the second and third frequency signals.

* * * * *